Oct. 10, 1933.   R. H. GODDARD   1,929,778
PROPULSION OF AIRCRAFT
Filed June 30, 1930   3 Sheets-Sheet 1
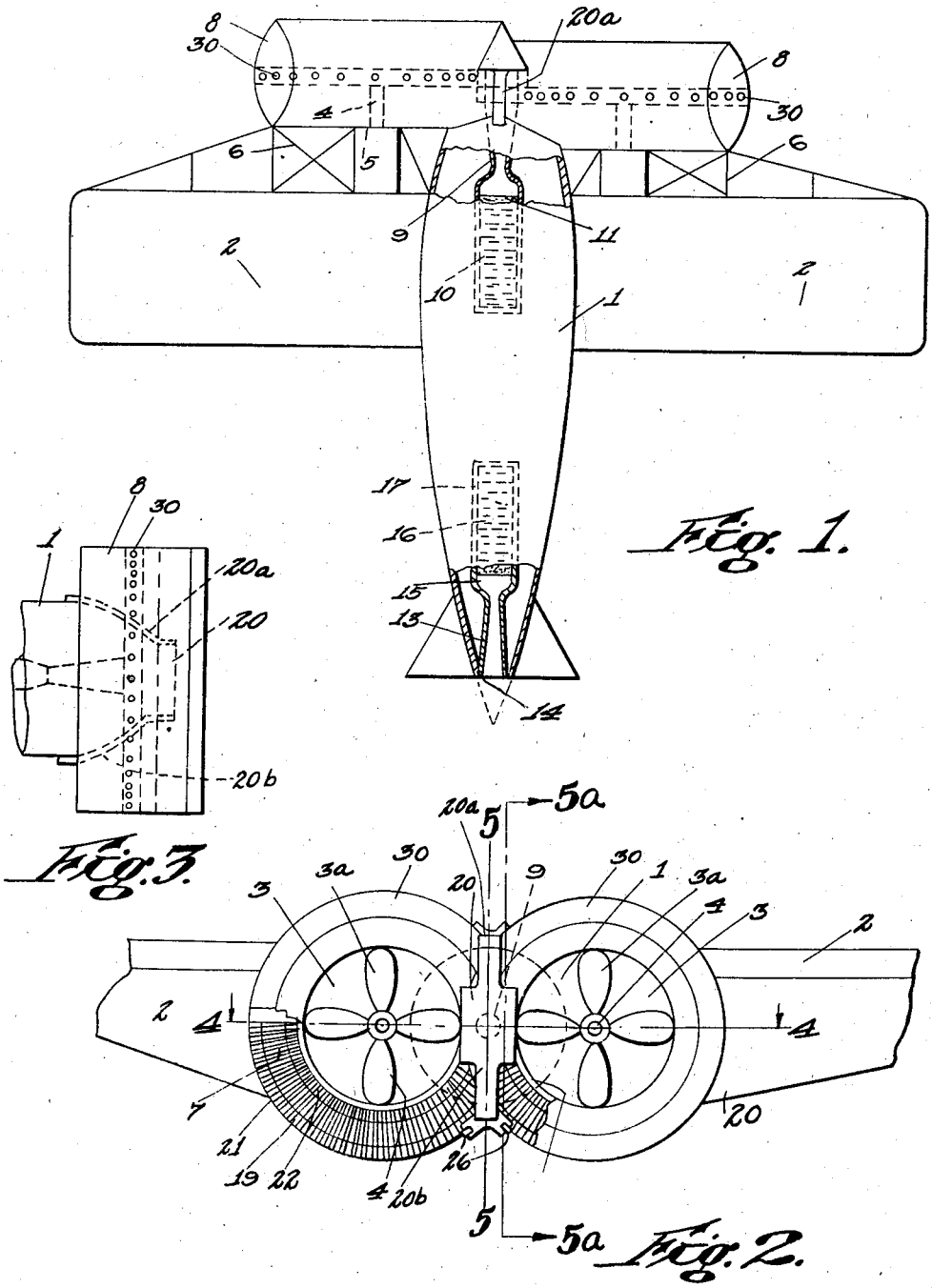

Oct. 10, 1933.  R. H. GODDARD  1,929,778
PROPULSION OF AIRCRAFT
Filed June 30, 1930   3 Sheets-Sheet 2
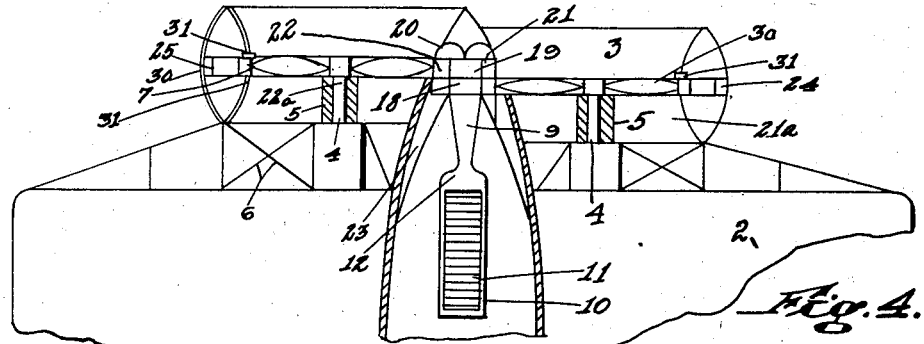
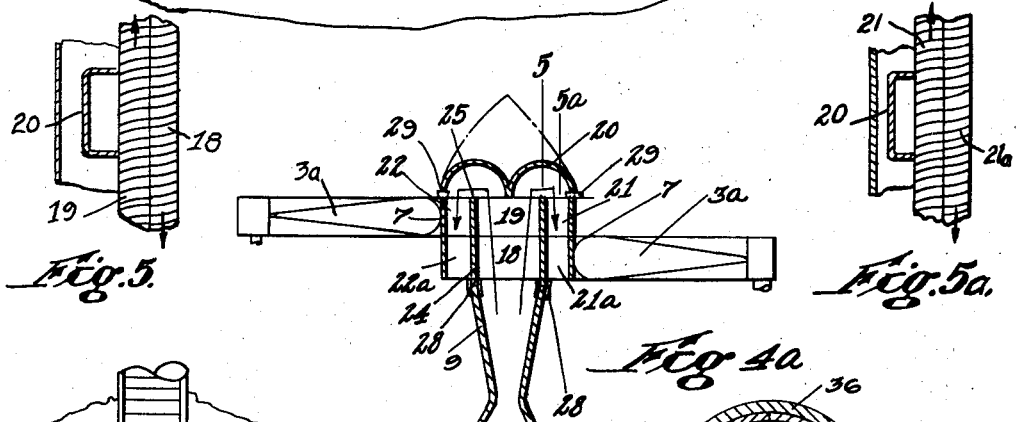
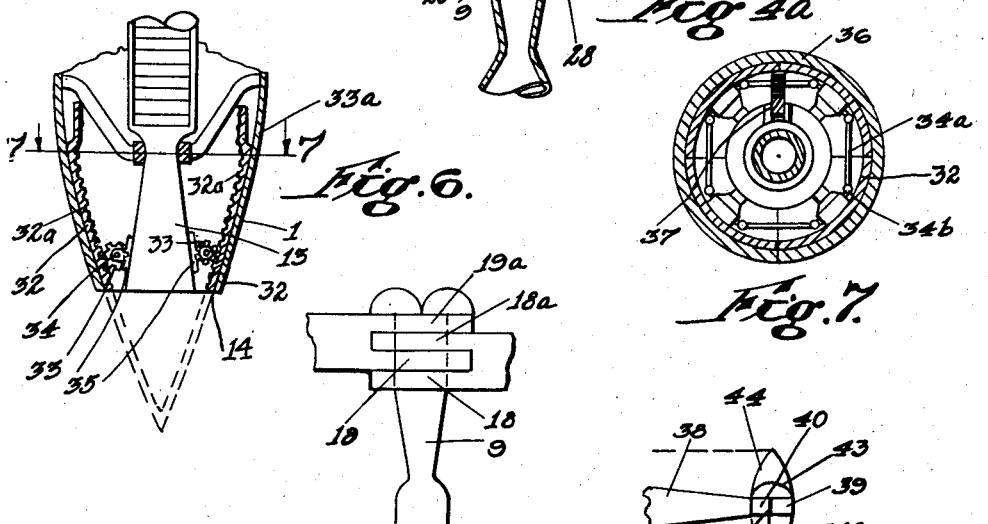
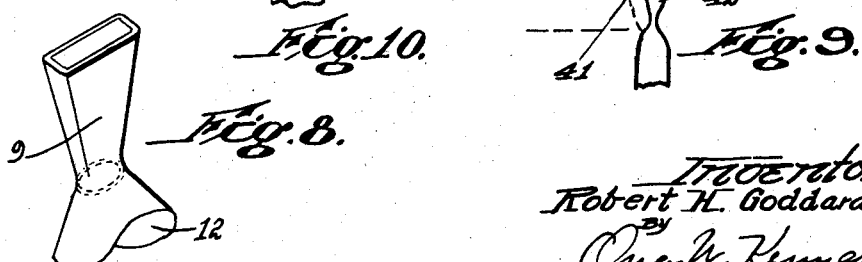
Inventor:
Robert H. Goddard
By
Owen N. Kennedy
Attorney Oct. 10, 1933.    R. H. GODDARD    1,929,778
PROPULSION OF AIRCRAFT
Filed June 30, 1930    3 Sheets-Sheet 3
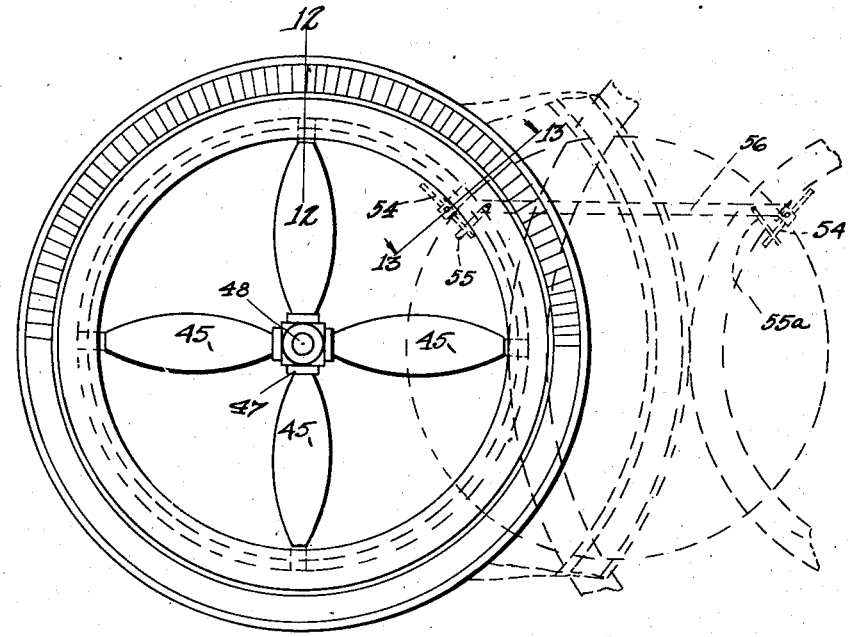
Fig. 11.
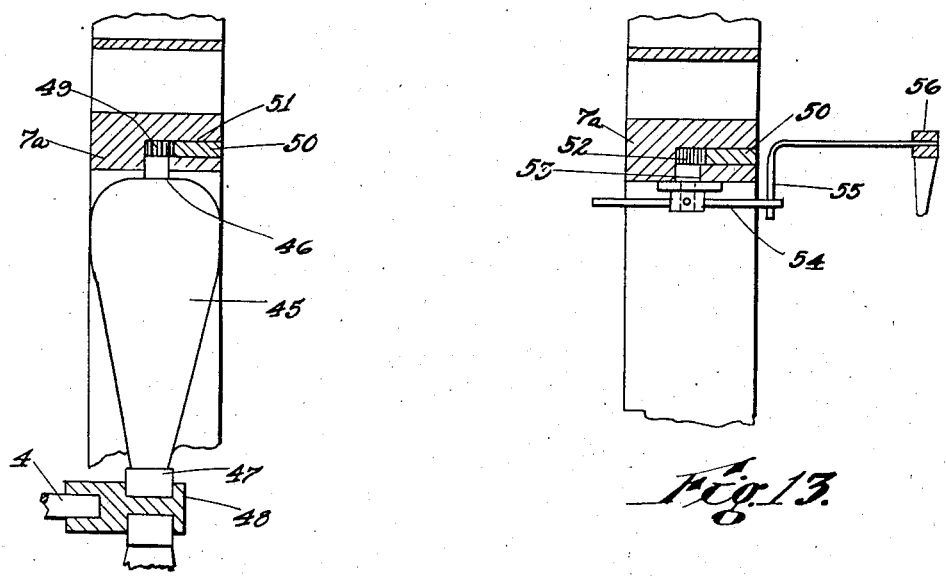
Fig. 12.
Fig. 13.
Inventor:
Robert H. Goddard Patented Oct. 10, 1933

1,929,778

UNITED STATES PATENT OFFICE 1,929,778

PROPULSION OF AIRCRAFT

Robert H. Goddard, Worcester, Mass., assignor of one-half to George Crompton, Worcester, Mass.

Application June 30, 1930. Serial No. 464,896

14 Claims. (Cl. 244—18)

The present invention relates to the propulsion of aircraft by means of one or more blasts of gas delivered at high velocity from one or more nozzles, and the object of the invention is to provide an improved manner and means for utilizing the energy of the gas blasts to obtain a maximum propelling effect under various conditions of flight, as well as to obtain a negative propelling or braking effect, as desired.

In my copending application, Serial No. 374,439, filed June 28, 1929 now Patent #1,809,271, dated June 9, 1931, for propulsion of aircraft, there is shown and described an arrangement which generally contemplates the utilization of high velocity gases to drive one or more turbine elements which in turn operate propellers for driving the aircraft. The aforementioned application also covers means whereby the amount of energy of a gas blast, converted into mechanical power by the propellers, can be varied from a condition in which all of the gas energy is converted into mechanical power, to a condition in which the propellers are rendered non-effective, so that the aircraft is propelled entirely by a rocket effect through the reaction of the gas blast itself.

The present invention has the same general objects as set forth in my aforementioned copending application and, in addition, contemplates certain improvements in the manner of converting the energy of the gases into rotation of the propellers, whereby the conversion is rendered more efficient. In tests carried on with a turbine wheel driven by a propelling jet at high velocity, I have been able to so control the flow of the propelling medium as to avoid the creation of any resultant force on the turbine wheel in a direction parallel to the axis of the aircraft, so that the turbine wheel will always rotate in balance. Other objects of the present invention, as distinguished from my aforementioned copending application, are to provide means for most effectively propelling the aircraft by rocket action alone, as well as means for utilizing the gas blast for obtaining a negative propelling, or braking effect, as when landing. The above and other advantageous features of the invention will hereinafter more fully appear with reference to the accompanying drawings in which—

Fig. 1 is a plan view of an aircraft embodying the present invention, certain parts being omitted owing to the reduced scale of the drawings.

Fig. 2 is a view in front elevation of the parts shown in Fig. 1.

Fig. 3 is a view in side elevation of a portion of the parts shown in Fig. 1.

Fig. 4 is a horizontal sectional view along the line 4—4 of Fig. 2, looking in the direction of the arrows.

Fig. 4a is a fragmentary view, based on Fig. 4, showing a portion of the parts on an enlarged scale.

Fig. 5 is a fragmentary sectional view along the line 5—5 of Fig. 2, looking in the direction of the arrows.

Fig. 5a is a fragmentary sectional view along the line 5a—5a of Fig. 2.

Fig. 6 is a fragmentary sectional view of the rear portion of the body of the aircraft.

Fig. 7 is a sectional view along the line 7—7 of Fig. 6.

Fig. 8 is a fragmentary view showing a preferred form of blast nozzle construction.

Fig. 9 is a fragmentary sectional view showing a modification of the turbine blade construction.

Fig. 10 is a fragmentary view showing multiple stage turbine wheels.

Fig. 11 is a view of a propeller wheel showing an arrangement for varying the pitch of the propeller blades.

Fig. 12 is a fragmentary sectional view along the line 12—12 of Fig. 11, looking in the direction of the arrows.

Fig. 13 is a fragmentary sectional view along the line 13—13 of Fig. 11, looking in the direction of the arrows.

Like reference characters refer to like parts throughout the drawings.

Referring first to Figs. 1 and 4, an aircraft body 1 of streamline form provides suitable planes or wings 2 preferably of a type best suited for supporting the craft at high speeds. Two propeller wheels 3, 3 are mounted forwardly of the body 1 on shafts 4 supported in bearings 5 which are secured by suitable struts 6 to the cross bracing of the planes 2. As best shown in Figs. 2 and 4a, the propeller wheels provide blades 3a rotatable with their surrounding rims 7 which in turn carry integral turbine blades, the particular form of which will be hereinafter described. The propeller wheels 3 are adapted to rotate within fixed hollow housings 8 of streamline form supported by the bracing of the planes 2, the general arrangement of the propeller wheels and their surrounding casings being similar to the arrangement shown in my aforementioned copending application, Serial No. 374,439.

Referring again to Fig. 1, the body 1 of the aircraft carries in front of the planes 2 a discharge nozzle 9 which is adapted to deliver forwardly to the propeller wheels 3 a blast of gas at high velocity resulting from the combustion of a suitable fuel in a container, or rocket, 10 having its discharge end located adjacent to the rear opening of the nozzle 9. It is more or less immaterial, in so far as the present invention is concerned, as to just how the blast is produced at the nozzle 9, but for purposes of illustration the container or rocket 10 is shown as being of the type described in my Patent No. 1,102,653, issued July 7, 1914, in which a number of charges 11 are adapted to be ignited within a combustion chamber 12 to produce a continuous blast of gas at high velocity through the nozzle 9. Obviously, the rocket may utilize solid, liquid, or gaseous fuel for its charge and suitable means may be provided for replenishing the charge of the rocket in accordance with the consumption of fuel.

In addition to the forwardly pointing nozzle 9 which operates the propeller wheels 3, in a manner hereinafter described, the aircraft also provides a second discharge nozzle 13 at the rear end of the body 1, which nozzle 13 is adapted to discharge a gas blast rearwardly through an opening 14 in the tail of the body 1. The combustion chamber 15 of the nozzle 13 is preferably supplied with a blast of gas from charges 16 in a separate rocket 17, so that the nozzles 9 and 13 may be operated independently of each other. Since the forward mounting of the propeller wheels 3 and nozzle 9 leaves the rear part of the aircraft clear, the rear nozzle 13 may be employed to propel the aircraft by rocket effect, alone, when the aircraft is travelling at a speed high enough to make full rocket propulsion more efficient than propulsion by propeller action.

Having described the general arrangement of propeller wheels and nozzles and the manner in which they may be utilized to propel the plane under different flying conditions, there will next be described the particular construction of the turbine blades carried by the propeller wheels 3, whereby the conversion of the energy of the gas blast from the nozzle 9 is obtained in a most effective manner, without the creation of any resultant axial force acting on the wheels 3.

Referring now to Fig. 4, the high velocity gases on leaving the forward nozzle 9 impinge upon and pass through a set of turbine blades 18 carried by one of the propeller wheels 3, the effect of which is to reduce the velocity of the blast somewhat and give it some tangential velocity. From the blades 18 the gas blast passes through another set of blades 19 carried by the other propeller wheel, the arrangement of the blades being illustrated clearly in the fragmentary showing of Fig. 4a. The co-action between the gas and the second set of blades 19 serves to further reduce the speed of the gas and also to reduce the tangential velocity substantially to zero. The curvature of the blades 18 and 19 is such that the same axial force is exerted on each propeller wheel, and this holds true even when the number of stages of the turbine is increased, as by adding additional sets of blades 18a and 19a to the wheels, as indicated in Fig. 10.

As previously pointed out, the gases leave the blades 19 of the second stage with no tangential velocity, and with an axial velocity of approximately half of the speed with which the gases left the nozzle 9. After leaving the blades 19, the gases are deflected back in the opposite direction by means of a deflector plate 20, which, as shown in Fig. 2, is supported by braces 20a and 20b, extending from the front of the body 1. The deflector 20 is made with a double curvature so that the gases coming from the blades 19 are divided equally and deflected back to impinge upon two sets of blades 21 and 22 on the front propeller wheel and two sets of blades 21a and 22a on the other wheel, these blades being shown on an enlarged scale in Fig. 4a. The secondary blades 21, 22 and 21a, 22a are so formed as to reduce the speed of the gases issuing from the blades 21a and 22a to zero, tangentially and nearly to zero axially, the gases merely retaining enough axial velocity to clear the turbine wheels. In order to facilitate the passage of the exhaust from the turbine wheels, grooves or depressions 23 are provided on the body 1 at opposite sides of the nozzle 9, which grooves are streamlined to insure rapid passage of the exhaust gases to the rear of the body 1.

By means of the above described arrangement of multiple sets of blades, there are exerted equal and opposite axial forces on each propeller wheel 3 and these forces are so closely balanced as to produce no appreciable distortion of the wheels. Furthermore, since the forces are equal and opposite they produce no resultant force on either wheel as a whole, so that the gas blast from the forward nozzle 9 serves to drive the propellers in unison and in exact balance at all times.

As best shown in Figs. 3 and 4a the several sets of propeller blades 18, 21a and 22a on one wheel and 19, 21 and 22 on the other wheel are formed integrally with the wheel rims 7, with annular partitions 24 and 25 separating the blades 18 and 19 from the blades 21, 21a, 22 and 22a. These partitions 24 and 25 serve to retract and confine the gases to the blades 18 and 19 in one direction and to the blades 21, 21a and 22, 22a in the opposite direction, the partitions being positioned substantially in alinement with the center of curvature of each gas deflector portion 20. In addition, these partitions 24 and 25 serve the additional purpose of preventing the propeller wheels from rubbing against each other due to any stresses which might tend to produce a deflection of the wheels, from air currents, or the gyroscopic force acting on the wheels due to sudden turns of the aircraft itself. Furthermore, rollers 26 may be mounted between the wheels, the rollers 26 being carried on fixed arms 27 extending from the deflector braces 20a and 20b, see Fig. 2, and free rotation of the propeller wheels can be further aided by the provision of rollers 28 and 29 on the end of the gas nozzle 9 and along the parallel edges of the deflector 20. The rollers 26, 28 and 29 are preferably of small diameter so as to just separate the edges of the nozzle, blades and deflector without permitting any appreciable escape of the gases.

The housings 8 which surround the propeller wheels are preferably made as nearly air-tight as possible, except for outer peripheral openings 30, see Fig. 1, the housings fitting closely to the rims 7 of the wheels around their inner edges, with rollers 31 interposed at intervals, see Fig. 4. The housings 8 are streamlined as previously pointed out and at the points where they approach the nozzle 9 are so shaped as to avoid interference with exhaust gases passing through the grooves 23. The particular reason for utilizing substantially air-tight housings 8 and for providing a close fit between the housings 8 and the propeller wheels, is the fact that the air within the housings 8 will be at a reduced pressure when the wheels are driven. This reduced pressure results because the centrifugal force developed by rotation of the wheels at high speeds drives the air out of the casing openings 30, thus lending to the effective operation of the turbine blades by reduced air friction. Although the cross section of the discharge portion of the nozzle 9 may be circular, a preferred form for this nozzle is shown in Fig. 8, from which it is evident that the discharge portion is rectangular in cross section. This rectangular section of the nozzle 9 insures that the gases will impinge upon the blades uniformly, which result would not be possible with a circular cross section. It is also evident from Fig. 8 that the cross section of the discharge end of the nozzle 9 is such that it is relatively narrow along the radius of the propeller wheels and wide in a tangential direction, thereby making it possible to employ narrow turbine blades and reduce the width of the housings 8 as much as possible. The cross section of the nozzle adjacent the combustion chamber 12 is preferably oval so as to introduce the gases into the rectangular portion of the nozzle with a minimum amount of friction.

As previously pointed out, the body 1 provides a second blast nozzle 13 pointing rearwardly and in order to prevent the production of a negative pressure, or vacuum, behind the nozzle 13 when the craft is being driven at high speed by propellers, the invention contemplates a temporary extension of the body 1 behind the opening 14 at the rear nozzle 13. One arrangement for continuing the streamline of the body 1 beyond the nozzle 13 is shown in Figs. 6 and 7 and comprises the use of curved body sections 32 collapsible within the open end of the body 1. Each section 32 provides a series of teeth 32a in engagement with a pinion 33, mounted on a shaft 34, rotatably supported in a bracket 35 carried by the outside of nozzle 13. The collapsible body sections 32 are shown as being retracted within the body 1 which is the position they occupy when utilizing the rear nozzle 13 for rocket propulsion. However, when the propeller wheels are in operation by the nozzle 9, the sections 32 are extended outwardly to the dotted line position by turning the pinions 33. The pinions 33 and shafts 34 may be turned in unison by means of intermediate shafts 34a connected by universal joints 34b all driven by a pinion 36 adapted to be turned by a rack 37 movable on the nozzle, see Fig. 7.

It will be obvious that certain variations and modifications of the above described arrangements for driving propeller wheels may be made without departing from the scope of the present invention. Thus, the same aircraft can be provided with more than one pair of propeller wheels cooperating with more than one nozzle, or a single wheel may be employed in connection with one nozzle. In fact a propeller of the type ordinarily in use in aircraft may be provided with turbine blades, and one or more rockets and nozzles be employed to give this propeller a very high speed. As shown in Fig. 9, a single propeller wheel providing blades 38 is surrounded by a ring carrying turbine blades 39 and 40 supported by a partition 41. This wheel is adapted to be driven by a nozzle 42 having a relatively narrow opening equal only to the width of the blades 39. The gases issuing from the nozzle 42 pass through the blades 39, thereby reducing the speed of the gases approximately one-half for which the gases are deflected rearwardly by a deflector 43 so as to impinge upon the other set of blades 41 of the same wheel. In this modified arrangement, the deflector 43 is carried by a streamline casing 44.

In any of the above described arrangements of discharge nozzles and turbine blades to rotate a propeller wheel, it is desirable to be able to feather, or vary the pitch of the individual propeller blades to meet different conditions of flying. Thus when the rear nozzle 13 is being utilized, the blades of the forward propeller wheels would be feathered in such a way as to present a minimum resistance to forward movement of the aircraft. In addition, when the craft is being decelerated the propeller blades would be feathered so as to produce a rearward or negative force on the craft. The fact that each propeller wheel provides a closed rim 7 surrounding the propeller blades and carrying the turbine blades, makes it readily possible to mount the propeller blades for pivotal movement about an axis passing radially through the propeller shaft 4. It is well known that in previous attempts to provide for the feathering of propeller blades, the pivotal support of a blade on the hub of the propeller shaft presents certain mechanical difficulties due to the forces set up at the free ends of the blade when the propeller is rotated. However, with my improved type of propeller wheel, each propeller blade can be pivotally supported at its outer end in the solid rim which supports the turbine elements.

As best shown in Figs. 11 and 12, each propeller blade 45 is provided at its outer end with a pin 46 received in the surrounding propeller rim 7a, while the base 47 of the blade 45 is turnable on the hub 48 which rotates on the stationary supporting shaft 4. With this construction, the blade 45 is pivotally supported about an axis passing radially through the shaft 4, the pivot bearings at opposite ends serving to firmly support the blade. In order to turn the blades 45 in unison a predetermined angle, each pivot pin 46 provides teeth 49 engaged with radial teeth of a gear ring 50 turnable angularly in a slot 51 provided in the rim 7a. As best shown in Fig. 13, the teeth of ring 50 are also in mesh with a pinion 52 mounted on a shaft 53 journaled in the rim 7a, so that turning of the shaft 53 will provide means for turning all of the blades 45 in unison. Since the shaft 53 turns with the propeller wheel, turning movement may be imparted thereto by means of pins 54 projecting radially from the shaft 53 into the path of a shiftable operating rod 55 extending from the body 1. Preferably, the rod 55 is carried by a bar 56 which extends across the body 1 and supports a similar rod 55a for the outer wheel, as indicated in dotted lines in Fig. 11. Thus the propeller blades of both wheels may be feathered in unison, to the same degree.

From the foregoing it is apparent that by the present invention there is provided an extremely effective and flexible arrangement for propelling aircraft at high speeds by utilizing the energy of gases travelling at high velocity. By the provision of discharge nozzles at opposite ends of the aircraft it is possible to propel the same by either the propeller wheels or by rocket effect alone, without one mode of operation interfering with the other.

I claim,

1. In an aircraft, the combination with a propeller rotatably mounted on a shaft with the blades thereof surrounded by a ring carrying two sets of propelling vanes, of means for causing a stream of a propelling medium travelling at high velocity to first impinge upon one set of vanes in one direction, and then to impinge upon the other set of vanes in the opposite direction whereby to obtain a balanced axial force on the shaft of said propeller.

2. In an aircraft, the combination with a source of energy and means for creating a stream of propelling medium travelling at high velocity from said source of energy, turbine wheels mounted on spaced parallel axes on opposite sides of said stream providing alined propelling vanes located in the stream, and propellers surrounded by said vanes, of means for preventing frictional engagement between said turbine wheels.

3. In an aircraft, the combination with a source of energy and means for creating a blast of gas travelling at high velocity from said source of energy, turbine wheels mounted on spaced parallel axes on opposite sides of said gas blast providing alined propelling vanes located in the blast, and propellers surrounded by said vanes, of antifriction means interposed between said turbine wheels at the points where their peripheries intersect each other.

4. In an aircraft, a propeller wheel comprising a rotatably mounted hub, propeller blades extending radially from said hub, a ring surrounding said propeller blades and carrying turbine vanes around its outer periphery, and means for pivotally supporting each propeller blade at its ends between said hub and the inner periphery of said vane ring.

5. In an aircraft, a propellor wheel comprising a rotatably mounted hub, propeller blades extending radially from said hub, a ring surrounding said propeller blades and carrying turbine vanes around its outer periphery, and means for pivotally supporting each propeller blade at its ends between said hub and the inner periphery of said vane ring, and means carried by said ring for simultaneously shifting said blades on their pivotal axes.

6. In an aircraft, the combination with a pair of propeller wheels each comprising a rotatably mounted hub surrounded by a ring, with propeller blades pivotally supported at their ends between said hub and said ring, of means cooperating with the rings of said wheels for simultaneously turning all of said propeller blades about their pivotal axes, turbine blades attached to said ring, and means for creating a blast against said turbine blades to impel said propeller blades.

7. In an aircraft, the combination with a pair of propeller wheels each comprising a rotatably mounted hub surrounded by a ring, with propeller blades pivotally supported at their ends between said hub and said ring, of a member operable from the body of said aircraft for turning the blades of both wheels in unison about their pivotal axes through a predetermined angle, turbine blades attached to said ring, and means for creating a blast against said turbine blades to impel said propeller blades.

8. In an aircraft, the combination with tractor propellers and means for creating a gas blast directed forwardly of said aircraft, of turbine blades carrier by said propellers and means for reversing the action of said gas blast to cause it to impinge on the blades in a rearward direction.

9. In an aircraft, the combination with a propeller of a double set of turbine blades attached thereto, means for directing a blast of gas against one set of blades, and means for reversing the axis of the blast to direct it against the other set of blades.

10. In an aircraft, the combination with a body section, of a gaseous discharge nozzle at the rear thereof, a stream line housing covering said nozzle, and means for moving said housing to open the orifice of said nozzle.

11. In an aircraft, the combination with a body section, of a gaseous discharge nozzle at the rear thereof, a streamline housing for said nozzle comprising movable sections, and means for moving said sections to cover said nozzle and, in the other position of said sections, to uncover said nozzle.

12. In an aircraft, the combination with a body section, of a gaseous discharge nozzle at the rear thereof, a slidable plate, means which with said slidable plate in one position forms a streamline housing covering said nozzle, and means to slide said plate to its position covering said nozzle and away therefrom.

13. In an aircraft, the combination with a body section, of a gaseous discharge nozzle at the rear thereof, a pair of plates slidable to a position covering said nozzle forming a streamline housing therefor, and means for moving said plates comprising a rack, and driving means to operate said rack.

14. In an aircraft, the combination of a body section, whose side walls slope towards each other at the rear thereof in streamline shape except for a truncated portion, a gaseous discharge nozzle located in said body section with the open end of said nozzle directed to the rear of the body section and substantially at the truncating plane, and movable streamlining housing means to extend the walls of said body section to cover said nozzle comprising plates and means for sliding them substantially parallel to the said walls of said body section, the ends of the plates in the streamline position thereof meeting.

ROBERT H. GODDARD.